(12) United States Patent
Parla et al.

(10) Patent No.: US 12,255,831 B2
(45) Date of Patent: Mar. 18, 2025

(54) WORKLOAD MIGRATION FOR MULTIPATH ROUTED NETWORK SESSIONS

(71) Applicant: Cisco Technology, Inc., San Jose, CA (US)

(72) Inventors: Vincent E. Parla, North Hampton, NH (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/866,932

(22) Filed: Jul. 18, 2022

(65) Prior Publication Data

US 2024/0022521 A1 Jan. 18, 2024

(51) Int. Cl.
*H04L 47/726* (2022.01)
*H04L 47/11* (2022.01)
(Continued)

(52) U.S. Cl.
CPC ............ *H04L 47/726* (2013.01); *H04L 47/11* (2013.01); *H04L 47/745* (2013.01); *H04L 47/827* (2013.01)

(58) Field of Classification Search
CPC ... H04L 47/125; H04L 12/4633; H04L 45/64; H04L 45/74; H04L 41/12; H04L 41/40; H04L 45/24; H04L 45/38; H04L 45/04; H04L 41/0895; H04L 45/02; H04L 41/0803; H04L 47/12; H04L 69/22; H04L 45/42; H04L 43/0817; H04L 45/586; H04L 49/25; H04L 45/22; H04L 12/4641; H04L 41/0806; H04L 43/20; H04L 45/28; H04L 67/1097; H04L 67/10; H04L 41/22;
(Continued)

(56) References Cited

U.S. PATENT DOCUMENTS 10,447,806 B1   10/2019  Sahay et al.
11,665,090 B1 *  5/2023  Banerjee ............... H04L 45/745
                                                       709/238
(Continued)

OTHER PUBLICATIONS

PCT Search Report and Written Opinion mailed Oct. 23, 2023 for PCT Application No. PCT/US2023/027029, "Workload Migration for Multipath Routed Network Sessions", 24 pages.
(Continued)

*Primary Examiner* — Djenane M Bayard
(74) *Attorney, Agent, or Firm* — Lee & Hayes, P.C.

(57) ABSTRACT

Techniques for migrating on-premises and/or cloud-based workloads to follow a network session as it potentially migrates, due to multipathing techniques, across multiple edge and/or cloud datacenters. The techniques may include determining, by a controller of a network, that a traffic flow between an endpoint device and a workload has migrated to a different path of a multipath flow such that the traffic flow terminates at a different termination point than the workload. Based at least in part on determining that the traffic flow has migrated, the controller may cause a migration of a state of the workload to a location associated with the different termination point. That is, the controller may cause the workload to be migrated in its current state, which may be specific to the endpoint device, to follow the traffic flow.

20 Claims, 5 Drawing Sheets

(51) Int. Cl.
*H04L 47/70* (2022.01)
*H04L 47/74* (2022.01)

(58) Field of Classification Search
CPC ..... H04L 61/2592; H04L 45/54; H04L 49/70;
H04L 61/103; H04L 43/10; H04L 61/256;
H04L 67/1001; H04L 41/0893; H04L
45/50; H04L 2212/00; H04L 43/0876;
H04L 45/16; H04L 45/745; H04L
47/2483; H04L 45/66; H04L 69/16; H04L
41/5003; H04L 47/122; H04L 47/17;
H04L 41/122; H04L 45/125; H04L 49/15;
H04L 69/324; H04L 41/0816; H04L
45/7453; H04L 47/26; H04L 49/10; H04L
9/40; H04L 41/046; H04L 41/0894; H04L
41/00; H04L 41/0897; H04L 41/5025;
H04L 67/148; H04L 67/143; H04L
41/5054; H04L 67/01; H04L 67/56; H04L
67/1095; H04L 67/289; H04L 67/1008;
H04L 67/34; H04L 41/14; H04L 41/145;
H04L 61/5007; H04L 67/60; H04L
67/1031; H04L 43/0852; H04L 69/40;
H04L 41/16; H04L 41/0866; H04L
63/0272; H04L 67/51; H04L 67/568;
H04L 67/5681; H04L 41/0813; H04L
41/147; H04L 41/5096; H04L 43/16;
H04L 61/4511
See application file for complete search history.

(56) References Cited

U.S. PATENT DOCUMENTS

| | | | |
|---|---|---|---|
| 2015/0263901 A1* | 9/2015 | Kumar | H04L 45/0377 370/254 |
| 2015/0365327 A1* | 12/2015 | Barabash | H04L 47/20 370/235 |
| 2019/0215332 A1* | 7/2019 | Kaplan | H04L 45/00 |
| 2020/0214067 A1 | 7/2020 | Li | |
| 2020/0218566 A1* | 7/2020 | Maes | G06F 9/505 |
| 2021/0029088 A1 | 1/2021 | Mayya et al. | |
| 2021/0058329 A1 | 2/2021 | Perras | |
| 2021/0105275 A1 | 4/2021 | Bansal et al. | |
| 2021/0377166 A1 | 12/2021 | Brar et al. | |
| 2022/0124043 A1 | 4/2022 | Zhu et al. | |
| 2023/0393898 A1* | 12/2023 | Cully | G06F 9/5038 |

OTHER PUBLICATIONS

Taleb, "Follow Me Cloud: Interworking Federated Clouds and Distributed Mobile Networks", IEEE Network, vol. 27, No. 5, Oct. 3, 2013, pp. 12-19.

Teka, et al, "Nearby live virtual machine migration using cloudlets and multipath TCP", Journal of Cloud Computing: Advances, Systems and Applications, vol. 5, No. 1, Sep. 6, 2016, pp. 1-21.

* cited by examiner

WORKLOAD MIGRATION FOR MULTIPATH ROUTED NETWORK SESSIONS

TECHNICAL FIELD

The present disclosure relates generally to techniques for, among other things, migrating on-premises and/or cloud-based workloads to follow a network session as it potentially migrates, due to multipathing techniques, across multiple edge and/or cloud datacenters.

BACKGROUND

Multipathing network protocols have been around for a long time, and Multipath TCP (MPTCP) has been used to improve response times and network reliability in certain use cases. Another potential benefit of multipathing is the aggregate bandwidth available across all interfaces. For example, Wi-Fi and Cellular interfaces could potentially be used simultaneously to increase overall throughput.

One of the problems that multipathing presents is that a flow may be initiated at one place but migrate to another based on network conditions. This is particularly problematic with newer protocols, such as Quick UDP Internet Connections (QUIC), because the connection migration can occur without middle-box awareness. As such, multipathing (e.g., MPQUIC) can create problems where part of a flow is introspected and then the flow migrates to another interface and is no longer being introspected. One of the core problems associated with multipathing flows migrating from one place to another is that cloud or data center workloads may end up having to process a portion of a flow in a fragmented manner. In other words, it is possible for part of an application session to be terminated at two different data centers at the same time or to start in one data center and continue in another due to failover.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various technologies for migrating on-premises and/or cloud-based workloads to follow a network session as it potentially migrates, due to multipathing techniques, across multiple edge and/or cloud datacenters. By way of example, and not limitation, the techniques described herein may include determining, by a controller of a network, that a traffic flow between an endpoint device and a workload has migrated to a different path of a multipath flow such that the traffic flow terminates at a different termination point than the workload. For instance, the traffic flow may originally have terminated at a first data center where the workload is running, and the traffic flow may have migrated such that it terminates at a second data center where the workload is not running or where the state of the workload from the first data center is not known. Based at least in part on determining that the traffic flow has migrated, the controller may cause a migration of the workload or the state of the workload to a location associated with the different termination point (e.g., the second data center).

Additionally, the techniques described herein may be performed as a method and/or by a system having non-transitory computer-readable media storing computer-executable instructions that, when executed by one or more processors, performs the techniques described above.

EXAMPLE EMBODIMENTS

As discussed above, one of the core problems associated with multipathing flows migrating from one place to another is that cloud or data center workloads may end up having to process a portion of a flow in a fragmented manner. That is, it is possible for part of an application session to be terminated at two different data centers at the same time, or for the application session to start in one data center and continue in another data center due to failover.

Take, for example, a user who is accessing a workload from their home office over a Wi-Fi connection. That is, the user's endpoint device (e.g., laptop, cellphone, etc.) has a multipath connection over a home Wi-Fi network, and this multipath connection is used to access the workload. However, if the user and/or the user's device changes location (e.g., the user goes to a coffee shop, a company office, etc.), the Wi-Fi network fails, a better multipath route is identified, etc., then the user's multipath connection may be migrated to a different multipath route that terminates at a different location (e.g., a new cloud termination point, a new data center termination point, etc.). In such a scenario, the workload and its state may not be running at the different location. Additionally, any security functions or other workloads that were servicing the multipath flow may not be running at the different location. As such, the workload, its state, as well as any other security functions or other workloads may need to be migrated to the new location for the user to be unaware of the migration and/or not experience any problems.

This application is directed to technologies for migrating on-premises and/or cloud-based workloads to follow a network session as it potentially migrates, due to multipathing techniques, across multiple edge and/or cloud datacenters. For example, if a traffic flow between an endpoint device and a workload is migrated to a different path of a multipath flow such that the traffic flow terminates at a different termination point than the workload, a centralized policy controller (e.g., software-defined networking controller) may determine that the workload and/or a state of the workload needs to be migrated to a location associated with the different termination point (e.g., another data center). Additionally, the centralized policy controller may facilitate or otherwise cause the migration of the workload to the new location, including, in some instances, the state of the workload that is specific to the endpoint device.

By way of example, and not limitation, a method according to the techniques of this disclosure may include determining that a traffic flow between an endpoint device and a workload has migrated to a different path of a multipath flow such that the traffic flow terminates at a different termination point than the workload. For instance, the traffic flow may have originally been sent over a first path of the multipath flow and terminating at a first data center and, after the migration to the different path, the traffic flow may be terminating at a second data center that is different from the first data center. In some examples, a controller of a network may determine that the traffic flow between the endpoint device and the workload has migrated to the different path of the multipath flow. In some instances, the controller may be a centralized policy controller (e.g., a software-defined networking controller) that resides in the cloud. In some examples, the different termination points may be at different cloud data centers, cloud edge data centers, on-premises (on-prem) data centers, or the like.

In some examples, the method may include migrating a state of the workload to a location associated with the different termination point. For instance, the controller may facilitate or otherwise cause the migration of the state of the workload based at least in part on determining that the traffic flow has migrated. In examples, the workload may have been previously servicing the traffic flow at the original termination point/location. In some examples, the workload may be associated with an application, a service, a security function, or the like. In some examples, migrating the workload may include migrating one or more supporting workloads (e.g., security functions) that are operating on the flow.

In some examples, to migrate the workload, the workload and its state may be hibernated. For instance, the workload and its state may be hibernated, the hibernated workload may be migrated to the new location, and the workload may be restored at the new location using the hibernated workload. In some examples, prior to migrating the workload, a state of the workload may be determined that is specific to the endpoint device. In this way, that specific workload state can be resumed by the user at the new termination point.

In some examples, the traffic flow may have utilized another path of the multipath flow prior to being migrated to the different path, and the different path and the other path may each be associated with different networking technologies. For instance, the traffic flow may utilize the other path while the endpoint device has a Wi-Fi connection, and the traffic flow may utilize the different path while the endpoint device has a cellular connection, a direct connection, etc. In some examples, the traffic flow may be a multipath QUIC flow, a MASQUE flow, a DTLS-VPN flow, IPsec flow, or the like.

According to the techniques disclosed herein, several advantages in computer-related technology and networking can be realized. For example, the techniques provide for transparent migration of workloads their associated states to follow multipathing flows. Those skilled in the art will understand that the techniques of this disclosure are more comprehensive than just positioning a workload closest to a user, and that the techniques of this disclosure provide for workloads to actually follow a user's multipath flow to different data centers and/or other localities. As such, even if a multipath flow migrates midstream, the workload and all of its state may follow the flow to wherever it moves to, be that a different datacenter or to the cloud. This means that, for example, if a flow was terminated in a first data center where a specific security function (e.g., data loss protection (DLP), etc.) was being performed, and then multipathing resulted in the flow migrating to a second data center where the specific security function was not being performed, then the specific security function node would be migrated to the second data center and continue processing the flow without disruption and with the same policies. That is, among other things the techniques of this disclosure make it possible for multipathing techniques to cause an application session to be terminated at two different data centers at the same time (and/or to start in one data center and continue in another) without causing any of the adverse effects commonly present in such scenarios.

Additionally, the techniques disclosed herein enable intelligent workload placement such that one or more workloads can be operationalized in the best network proximity to a tunnel/proxy termination point. The techniques also enable intelligent security function placement that moves with the workload. For example, if a session had a DLP inspection node operating between the end user and the workload, this same functionality would migrate with the workload describe in. In summary, not only migrating the workloads, but any security functions that might have been present between the end user and the workload prior to migration. For instance, security workloads may be auto-instantiated at the location where data is traversing to match security policies of a user. As such, if a security function is needed for a particular network flow and that network flow migrates from an on-prem data center to another data center, the security function migrates with it.

The disclosed techniques also provide for intelligent migration of workloads. For instance, when a workload follows the user as their connection roams across network fabrics (e.g. Wi-Fi roams to Cellular), the intelligence includes session resumption on the new workload, when possible, so that application state is not disrupted as a result of roaming. In some instances, hibernation technologies may be used to first hibernate the workload and all state before moving it to the new operational location and restoring it from a hibernated state.

According to the techniques disclosed herein, optimal multipathing may be performed to send/receive data via an optimal termination point. As a user migrates to different locations (e.g., home, office, coffee shop, LTE network, 5G network, etc.), a network controller may indicate possible termination points and multipathing techniques may be used to determine best-paths to route the packets. In some examples, standard multipathing protocols like MPTCP, MPQUIC, or the like can be used to perform multipathing.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
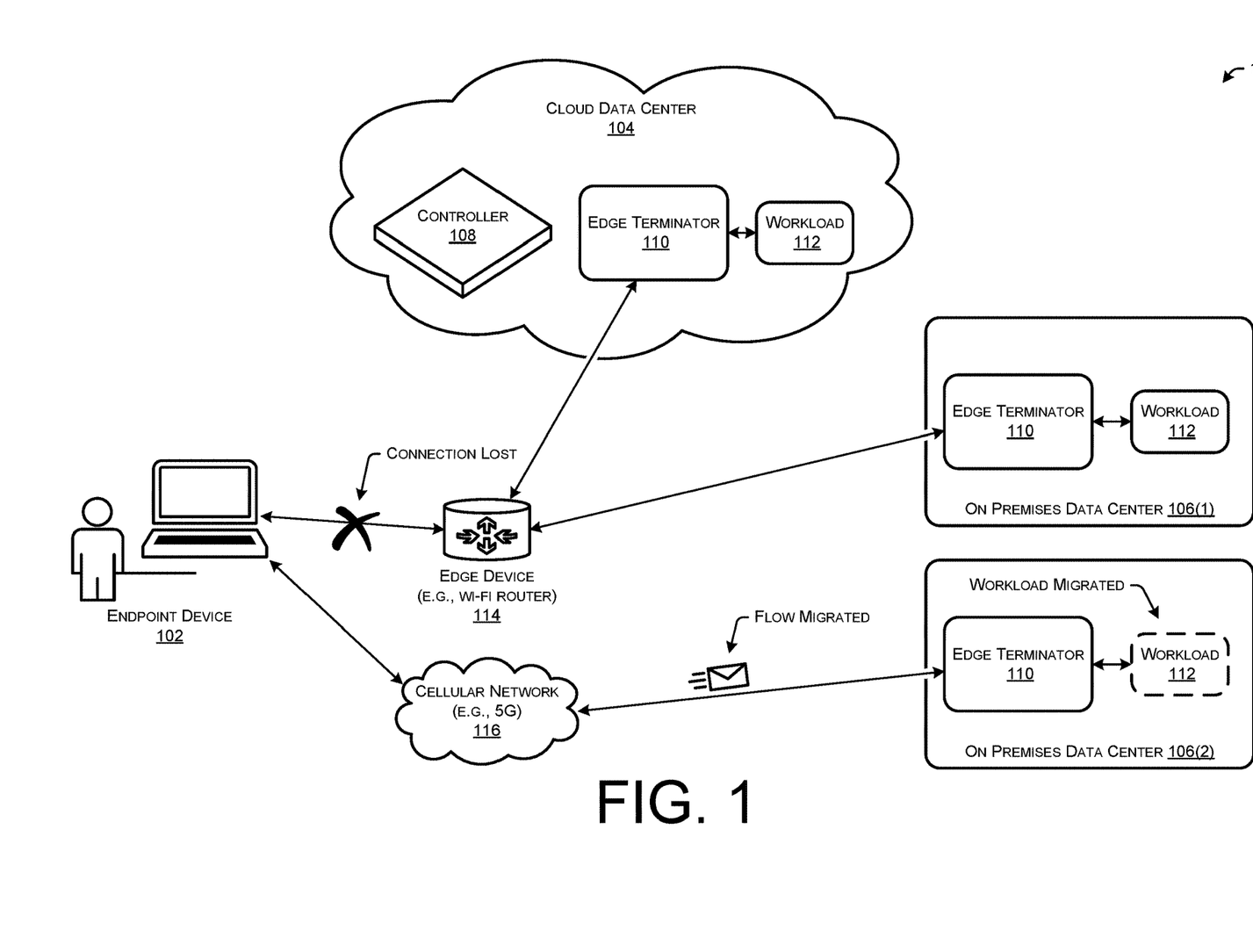
FIG. 1 illustrates an example architecture that may implement various aspects of the technologies described herein.

FIG. 1 illustrates an example architecture 100 that may implement various aspects of the technologies described herein. The architecture 100 includes an endpoint device 102. The endpoint device 102 may represent a computer, laptop, cell phone, tablet, or other electronic device that is capable of communicating data over a network. The architecture 100 also includes a cloud data center 104, a first on-premises data center 106(1), and a second on-premises data center 106(2) (hereinafter referred to collectively as "on-premises data centers 106").

In examples, the two on-premises data centers 106 may be located in different locations. The cloud data center 104 and the on-premises data centers 106 may be physical facilities or buildings located across geographic areas that are designated to store computing resources. The cloud data center 104 and the on-premises data centers 106 may include various networking devices, as well as redundant or backup components and infrastructure for power supply, data communication connections, environmental controls, internet-of-things devices, services, and various security devices. In some examples, the cloud data center 104 and the on-premises data centers 106 may include one or more virtual data centers which are a pool or collection of cloud infrastructure resources specifically designed for enterprise needs, and/or for cloud-based service provider needs. Generally, the cloud data center 104 and the on-premises data centers 106 (physical and/or virtual) may provide basic resources such as processor (CPU), memory (RAM), storage (disk), networking (bandwidth), security, and the like.

Resources of the cloud data center 104 and/or the on-premises data centers 106 may be capable or running or otherwise hosting controllers, such as the controller 108, edge terminators 110, one or more workloads, such as the workload 112, and the like. The controller 108 may be a centralized policy controller for the endpoint device 102, such as an SDN controller. The edge terminators 110 may be termination points for data flows between the endpoint device 102 and the cloud data center 104 or the on-premises data centers 106. In one example, the edge terminators 110 may be virtual private network (VPN) terminators, proxy terminators, or the like. The workload 112 may represent an application, service, capability, or a specified amount of work that consumes computing resources (e.g., compute, memory, etc.). In some examples, the workload 112 may be running at different termination points, such as the cloud data center 104 and the first on-premises data center 106(1).

As described herein, multipathing techniques may be used to create more than one physical path between the endpoint device 102 and the edge terminators 110 to provide better fault tolerance and/or performance enhancements for data flows. For instance, while the endpoint device 102 have a network connection through a local edge device 114 (e.g., a Wi-Fi router), the data flows of the endpoint device 102 may be sent to the edge terminators 110 of the cloud data center 104 and/or the first on premises data center 106(1). However, if the endpoint device 102 loses the connection with the edge device 114, then any data flows of the endpoint device 102 may be migrated and sent over the cellular network 116 to the edge terminator 110 of the second on-premises data center 106(2). If the workload 112 is not running at the second on-premises data center 106(2), then the workload 112 (including its state) may be migrated to the second on-premises data center 106(2).

For example, the controller 108 may determine that the traffic flow between the endpoint device 102 and the workload 112 of the cloud data center 104 or the first on-premises data center 106(1) has migrated to a different path of a multipath flow such that the traffic flow terminates at a different termination point (e.g., the edge terminator 110 of the second on-premises data center 106(2)) than the workload 112. As such, the controller 108 may determine a state of the workload 112 that is specific to the endpoint device 102, and cause the workload 112 to be migrated in that state to the second on-premises data center 106(2). In some examples, to migrate the workload 112, controller 108 may hibernate the workload 112 in its current state and then migrate the hibernated workload from its current location to the second on-premises data center 106(2). The controller 108 may then restore the workload 112 in its prior state at the new location using the hibernated workload.

Figure 2:
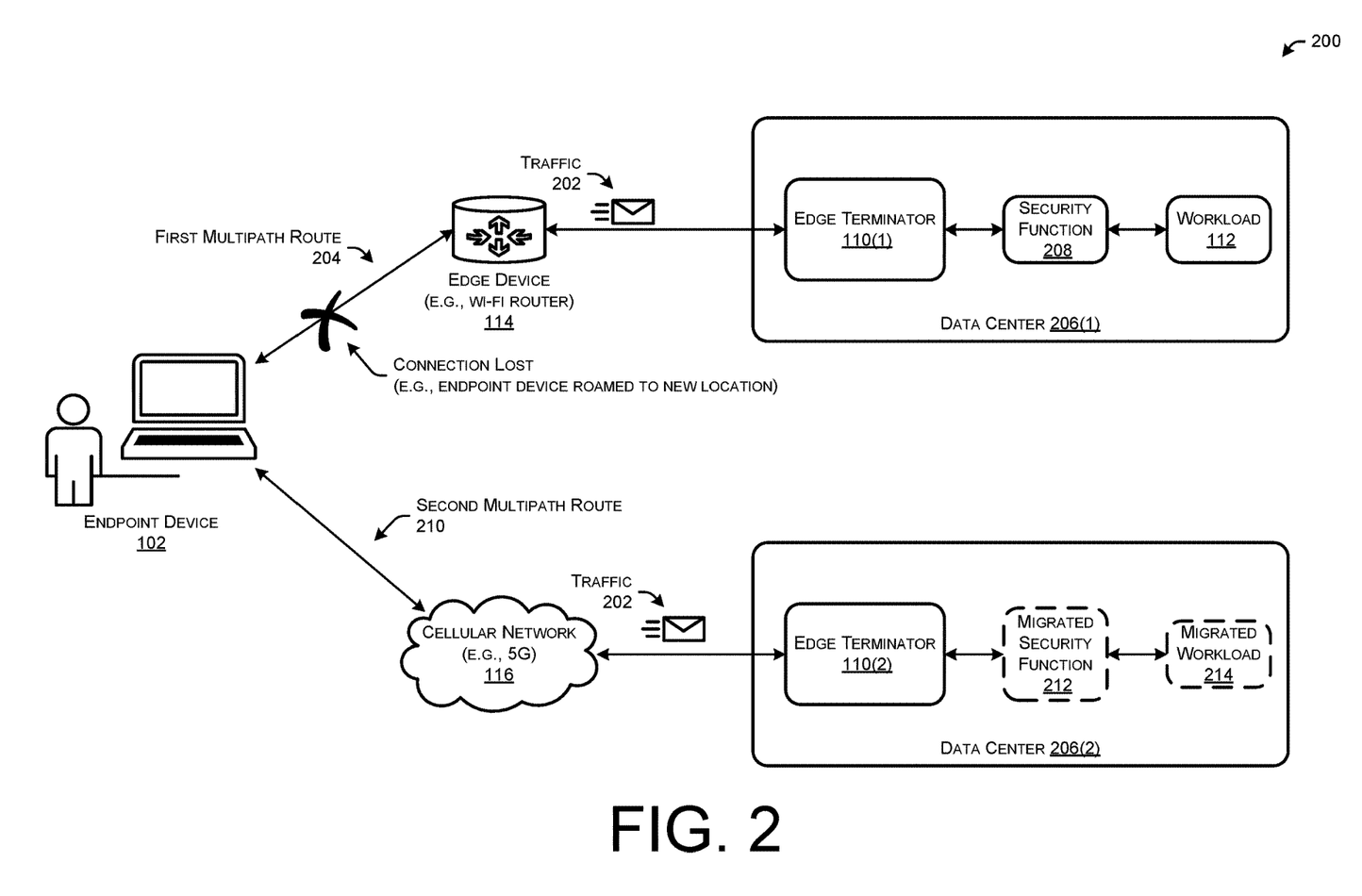
FIG. 2 illustrates an example of migrating workloads to follow a multipath network session.

FIG. 2 illustrates an example 200 of migrating workloads to follow a multipath network session. For example, while the endpoint device 102 is connected to an edge device 114 (e.g., Wi-Fi router), traffic 202 may flow between the endpoint device 102 and the workload 112 via a first multipath route 204. That is, the traffic 202 may be sent from the endpoint device 102 to the edge device 114, and then from the edge device 114 to the edge terminator 110(1) of the first data center 206(1), which may be a cloud data center, an edge data center, an on-prem data center, or the like. The traffic 202 may then be operated on by a security function 208 before being forwarded to the workload 112.

However, if the connection is lost between the endpoint device 102 and the edge deice 114, such as when the endpoint device 102 roams to a new location, the flow may be migrated such that the traffic 202 is sent over a second multipath route 210 to the second data center 206(2), which may be a cloud data center, an edge data center, an on-prem data center, or the like. The second multipath route 210 may include the cellular network 116. For instance, the traffic 202 may be sent from the endpoint device 102 over the cellular network 116 and to the edge terminator 110(2) of the second data center 206(2). In cases where the security function 208 and/or the workload 112 are not running at the second data center 206(2), the security function 208 and/or the workload 112 may be migrated to the second data center 206(2) according to the techniques described herein. In this way, the migrated security function 212 may operate on the traffic 202 before being sent to the migrated workload 214. In some examples, respective states of the security function 208 and the workload 112 may be determined and those states may be migrated as well with the migrated security function 212 and/or the migrated workload 214. In this way, security policies for the endpoint device 102 may be upheld and enforced regardless of where the flows of the endpoint device migrate to.

Figure 3:
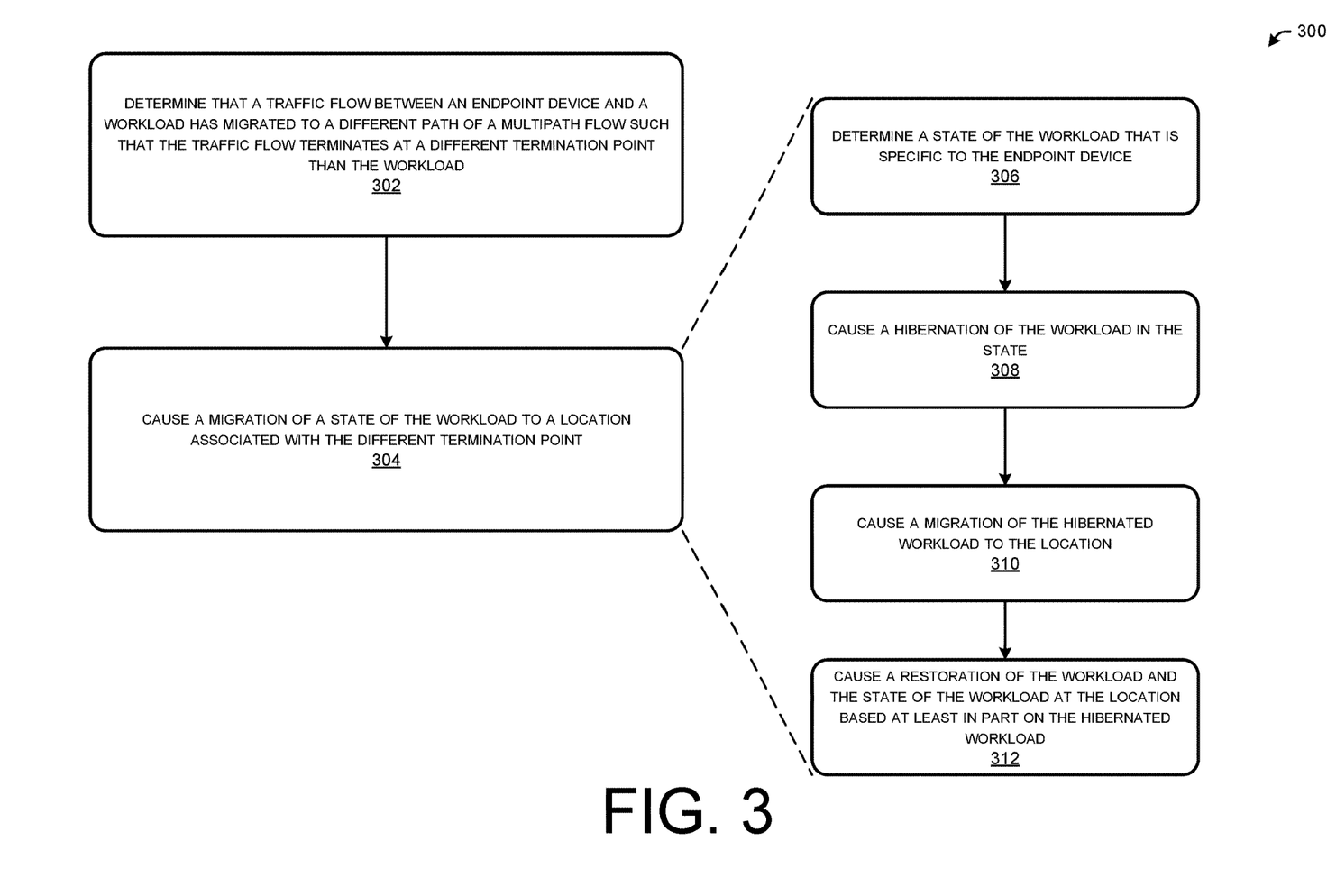
FIG. 3 is a flow diagram illustrating an example method according to the technologies disclosed herein.

FIG. 3 is a flow diagram illustrating an example method according to the technologies disclosed herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes determining that a traffic flow between an endpoint device and a workload has migrated to a different path of a multipath flow such that the traffic flow terminates at a different termination point than the workload. For instance, the controller 108 may determine that the traffic flow between the endpoint device 102 and the workload 112 has migrated to a different path of a multipath flow such that the traffic flow terminates at a different termination point (e.g., edge terminator 110 or data center) than the workload 112.

At operation 304, the method 300 includes causing a migration of a state of the workload to a location associated with the different termination point. For instance, the controller 108 may cause the migration of the state of the workload 112 to the location associated with the different termination point (e.g., the second data center 206(2)).

In some examples, operation 304 may include one or more operations 306-312 that may be performed to migrate the state of the workload to the location associated with the different termination point. At operation 306, the method 300 may include determining a state of the workload that is specific to the endpoint device. For instance, the controller 108 may determine the state of the workload 112 that is specific to the endpoint device 102.

At operation 308, the method 300 may include causing a hibernation of the workload in the state. For instance, the controller 108 may cause the hibernation of the workload 112 in the state that is specific to the endpoint device 102.

At operation 310, the method 300 may include causing a migration of the hibernated workload to the location. For instance, the controller 108 may cause the migration of the hibernated workload to the location (e.g., the second data center 206(2)).

At operation 312, the method 300 may include causing a restoration of the workload and the state of the workload at the location based at least in part on the hibernated workload. For instance, the controller 108 may cause the restoration of the migrated workload 214 and/or the migrated security function 212 at the location.

Figure 4:
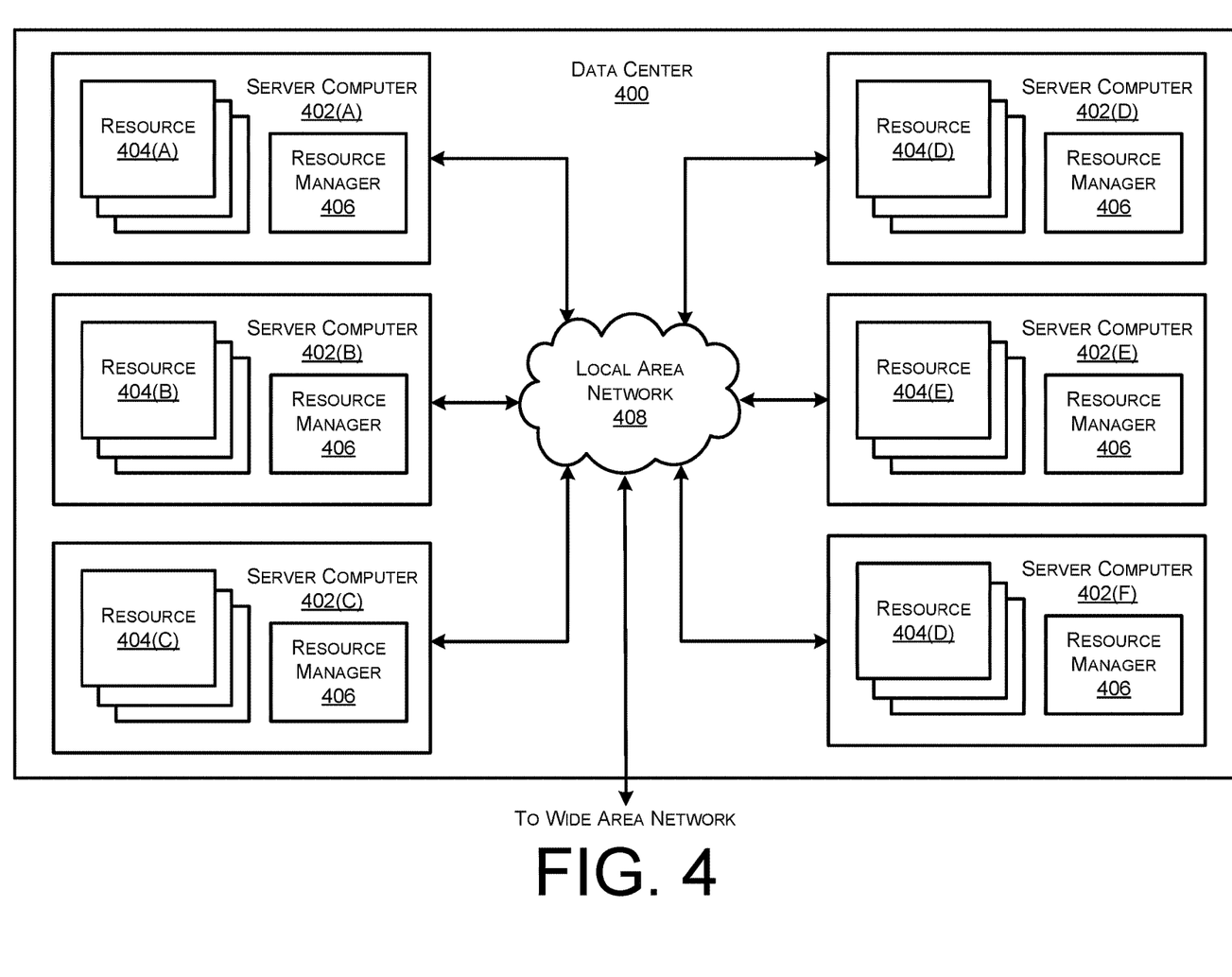
FIG. 4 is a computing system diagram illustrating an example configuration of a data center that can be utilized to implement aspects of the technologies disclosed herein.

FIG. 4 is a computing system diagram illustrating an example configuration of a data center 400 that can be utilized to implement aspects of the technologies disclosed herein. The example data center 400 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, any type of networked devices or nodes described herein. Although described as servers, the server computers 402 may comprise any type of networked device, such as servers, switches, routers, hubs, bridges, gateways, modems, repeaters, access points, etc. In some examples, the example data center 400 may correspond with the cloud data center 104, the on-premises data centers 106, and/or the data centers 206(1) and 206(2) described herein.

The server computers 402 can be standard tower, rackmount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, security, packet inspection, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate local area network (LAN) 408 is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402F in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more application containers and/or virtual machines to perform techniques described herein. In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like. The computing resources 404 may be utilized to run instances of security functions or other workloads.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, secure access points, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
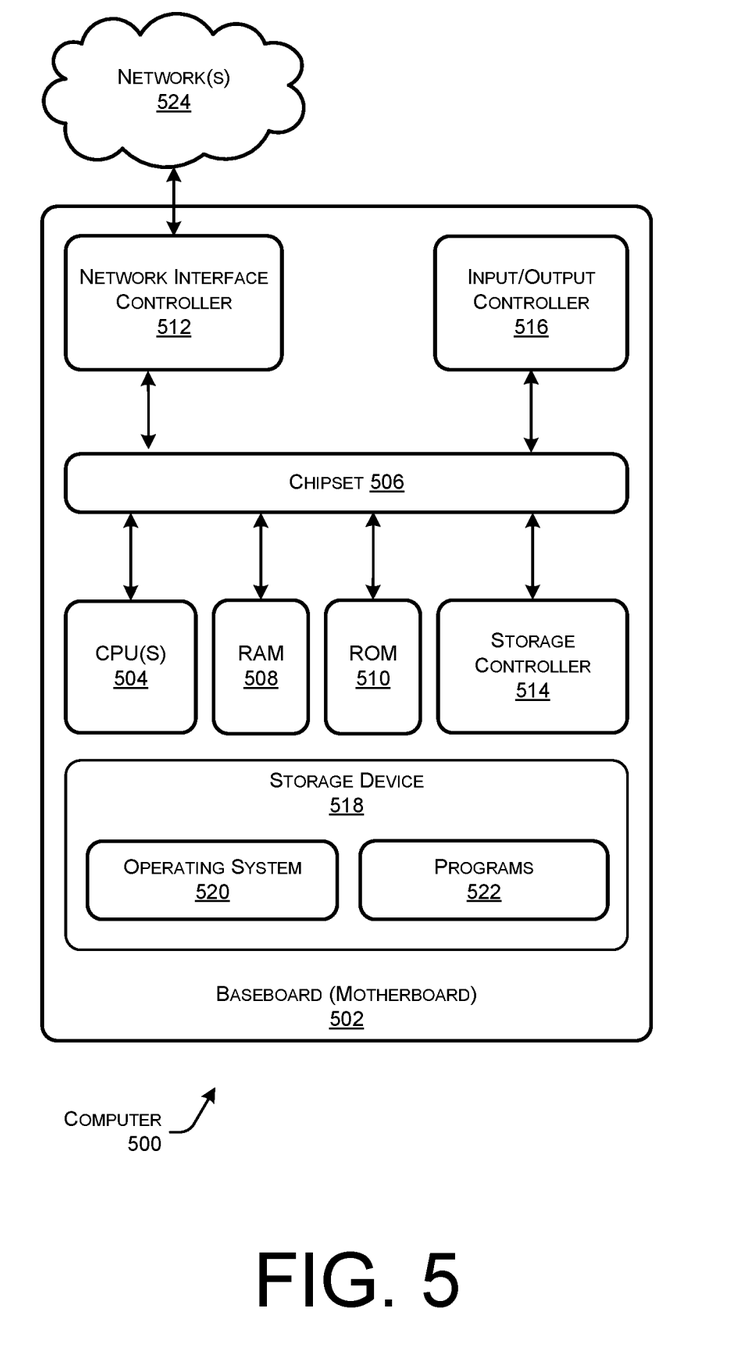
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network. The chipset 506 can include functionality for providing network connectivity through a NIC 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computer devices 500 operating in a scalable arrangement. By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for migrating on-premises and/or cloud-based workloads to follow a network session as it potentially migrates, due to multipathing techniques, across multiple edge and/or cloud datacenters.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

establishing a traffic flow, of a multipath flow, on a first path between an endpoint device and a first termination point running a first instance of a workload;

determining, by a controller of a network, that the traffic flow has migrated from the first path to a second path of the multipath flow such that the traffic flow terminates at a second termination point that is different than the first termination point running the first instance of the workload; and subsequent to determining that the traffic flow has migrated from the first path and to the second path of the multipath flow, causing, by the controller, a migration of a state of the first instance of the workload to a location associated with the second termination point as a second instance of the workload running on the second termination point.

2. The method of claim 1, wherein causing the migration of the state of the first instance of the workload comprises:

causing a hibernation of the workload and the state of the first instance of the workload;

migrating, to the location as a hibernated workload, the workload and the state of the first instance of the workload; and restoring the workload and the state of the first instance of the workload at the location and as the second instance of the workload based at least in part on the hibernated workload.

3. The method of claim 1, wherein causing the migration of the state of the first instance of the workload further comprises determining the state of the first instance of the workload that is specific to the endpoint device.

4. The method of claim 1, wherein the workload is associated with an application that is being accessed by the endpoint device.

5. The method of claim 1, further comprising causing, by the controller, a migration of a security function to the location, the security function previously servicing the traffic flow prior to the traffic flow being migrated to the second path of the multipath flow.

6. The method of claim 1, wherein the traffic flow utilized the first path of the multipath flow prior to being migrated to the second path, the second path and the first path associated with different networking technologies.

7. The method of claim 1, wherein the endpoint device utilizes the first path for the traffic flow while having a first type of network connectivity and utilizes the second path for the traffic flow while having a second type of network connectivity that is different from the first type of network connectivity.

8. The method of claim 7, wherein the first type of network connectivity utilizes a cellular connection and the second type of network connectivity utilizes a WiFi connection.

9. The method of claim 1, wherein the second termination point is associated with a different data center than a first data center hosting the workload prior to the traffic flow being migrated.

10. A system comprising:

one or more processors; and one or more non-transitory computer-readable media storing instructions that, when executed, cause the one or more processors to perform operations comprising:

establishing a traffic flow, of a multipath flow, on a first path between an endpoint device and a first termination point running a first instance of a workload;

determining that the traffic flow associated with the endpoint device has migrated from using the first path of the multipath flow to using a second path of the multipath flow, the first path terminating at a first data center and the second path terminating at a second data center that is different from the first data center; and subsequent to determining that the traffic flow has migrated from the first path and to the second path of the multipath flow, causing a migration of a state of the first instance of the workload to the second data center for servicing the traffic flow as a second instance of the workload running at the second data center, the first instance of the workload previously servicing the traffic flow at the first data center.

11. The system of claim 10, wherein causing the migration of the state of the first instance of the workload comprises:

causing a hibernation of the workload and the state of the first instance of the workload;

migrating, to the second data center as a hibernated workload, the workload and the state of the first instance of the workload; and restoring the workload and the state of the first instance of the workload at the second data center and as the second instance of the workload based at least in part on the hibernated workload.

12. The system of claim 10, wherein causing the migration of the state of the first instance of the workload further comprises determining the state of the first instance of the workload that is specific to the endpoint device.

13. The system of claim 10, wherein the workload is associated with an application that is being accessed by the endpoint device.

14. The system of claim 10, the operations further comprising causing a migration of a security function to the second data center, the security function previously servicing the traffic flow at the first data center prior to the traffic flow being migrated to the second path of the multipath flow.

15. The system of claim 10, wherein the first path of the multipath flow is associated with a first networking technology and the second path of the multipath flow is associated with a second networking technology.

16. The system of claim 10, wherein the endpoint device utilizes the first path of the multipath flow for the traffic flow while having a first type of network connectivity and utilizes the second path of the multipath flow for the traffic flow while having a second type of network connectivity that is different from the first type of network connectivity.

17. The system of claim 16, wherein the first type of network connectivity utilizes a cellular connection and the second type of network connectivity utilizes a WiFi connection.

18. One or more non-transitory computer-readable media storing instructions that, when executed, cause one or more processors to perform operations comprising:

establishing a traffic flow, of a multipath flow, on a first path between an endpoint device and a first termination point running a first instance of a workload;

determining that the traffic flow associated with an endpoint device has migrated from using the first path of the multipath flow to using a second path of the multipath flow, the first path terminating at a first data center and the second path terminating at a second data center that is different from the first data center; and subsequent to determining that the traffic flow has migrated from the first path and to the second path of the multipath flow, causing a migration of a state of the first instance of the workload to the second data center for servicing the traffic flow as a second instance of the workload running at the second data center, the first instance of the workload previously servicing the traffic flow at the first data center.

19. The one or more non-transitory computer-readable media of claim 18, the operations further comprising causing a migration of a security function to the second data center, the security function previously servicing the traffic flow at the first data center prior to the traffic flow being migrated to the second path of the multipath flow.

20. The one or more non-transitory computer-readable media of claim 18, wherein the endpoint device utilizes the first path of the multipath flow for the traffic flow while having a first type of network connectivity and utilizes the second path of the multipath flow for the traffic flow while having a second type of network connectivity that is different from the first type of network connectivity.

* * * * *